(12) United States Patent
McCurdy et al.

(10) Patent No.: US 8,430,178 B2
(45) Date of Patent: Apr. 30, 2013

(54) IMPLEMENT FLOTATION AND SUSPENSION SYSTEM

(75) Inventors: Justin P. McCurdy, Chico, CA (US); Joe S. Riggs, Chico, CA (US)

(73) Assignee: Weiss-McNair LLC, Chico, CA (US)

( * ) Notice: Subject to any disclaimer, the term of this patent is extended or adjusted under 35 U.S.C. 154(b) by 177 days.

(21) Appl. No.: 12/814,590

(22) Filed: Jun. 14, 2010

(65) Prior Publication Data

US 2010/0319311 A1 Dec. 23, 2010

Related U.S. Application Data

(60) Provisional application No. 61/187,714, filed on Jun. 17, 2009.

(51) Int. Cl.
*A01B 33/06* (2006.01)

(52) U.S. Cl.
USPC .......................................................... 172/59

(58) Field of Classification Search ................ 15/82–87, 15/340; 172/25, 45, 47, 48, 52, 57, 59, 111, 172/624.5, 78
See application file for complete search history.

(56) References Cited

U.S. PATENT DOCUMENTS

| | | | |
|---|---|---|---|
| 1,750,829 A | 2/1925 | Wilson | |
| 2,996,742 A | 8/1961 | Aimers | |
| 3,186,016 A | 6/1965 | Gehman | |
| 3,316,578 A | 5/1967 | Tamny | |
| 3,790,981 A | 2/1974 | Young | |
| 3,825,968 A * | 7/1974 | Veselka | 15/87 |
| 3,893,286 A | 7/1975 | Buttram | |
| 4,033,100 A | 7/1977 | McRobert | |
| 4,084,285 A | 4/1978 | Herzog | |
| 4,335,482 A | 6/1982 | Jones | |
| 4,368,554 A | 1/1983 | Mealing | |
| 4,518,043 A * | 5/1985 | Anderson et al. | 172/6 |
| 4,691,402 A * | 9/1987 | Veselka | 15/87 |
| 4,754,521 A | 7/1988 | Zoni | |
| 4,958,584 A | 9/1990 | Williamson | |
| 5,054,559 A * | 10/1991 | Paul | 172/59 |
| 5,570,653 A | 11/1996 | Gere | |
| 2003/0122341 A1 | 7/2003 | Smith | |
| 2007/0114747 A1 | 5/2007 | Morgan | |
| 2008/0067774 A1 | 3/2008 | Sanville | |

* cited by examiner

*Primary Examiner* — Robert Pezzuto
(74) *Attorney, Agent, or Firm* — William Bodnar

(57) ABSTRACT

Embodiments of the present invention relate to implement flotation and suspension systems typically utilized with agricultural equipment wherein an "implement" can be a brush, rake, broom, or any tool utilized to contact the ground surface; "flotation" refers to the ability of the systems to maintain a substantially consistent force applied by the implement on the ground surface it contacts and thus maintain a substantially consistent spacing between the ground surface being traversed (regardless of the regularity of the surface) and the implement section not in contact with the ground surface; and "suspension" refers to the suspension of some or all of the weight of the implement in relation to the surface being traversed.

18 Claims, 7 Drawing Sheets

IMPLEMENT FLOTATION AND SUSPENSION SYSTEM

CROSS REFERENCE TO RELATED APPLICATIONS

This application claims priority from U.S. Provisional Patent Application No. 61/187,714 filed Jun. 17, 2009. The contents of U.S. Provisional Patent Application 61/187,714 are incorporated herein by reference.

FIELD OF THE INVENTION

Embodiments of the present invention relate to implement flotation and suspension systems typically utilized with agricultural equipment wherein an "implement" can be a brush, rake, broom, or any tool utilized to contact the ground surface; "flotation" refers to the ability of the systems to maintain a substantially consistent force applied by the implement on the ground surface it contacts and thus maintain a substantially consistent spacing between the ground surface being traversed (regardless of the regularity of the surface) and the implement section not in contact with the ground surface; and "suspension" refers to the suspension of some or all of the weight of the implement in relation to the surface being traversed.

BACKGROUND OF THE INVENTION

Agricultural equipment or machinery is typically operated on unpaved ground surfaces which have varying degrees of undulations. Various suspension systems have been developed for automobiles and some have been utilized in agricultural vehicles. None of the systems provide an opportunity to control the contact between an agricultural vehicle's implement(s) and the ground surface the agricultural vehicle travels across. Typical agricultural equipment implements are used in soil preparation or crop planting, cultivating or gathering and include, but are not limited to, brushes, rakes, tines, blades, containment devices, rollers and wheels.

SUMMARY OF THE INVENTION

Embodiments of the present invention provide an assembly of components (or system) that is mounted to a vehicle which is typically agricultural equipment. The agricultural equipment includes an implement to "work" the ground before or after planting and/or an implement to gather crops at harvest. The implement flotation and suspension system described herein can control the relative position of the implement with respect to the ground surface the implement (or a portion of the implement) comes in contact with.

The implement flotation and suspension system described herein functions independently of the normal vehicle suspension system. The implement flotation and suspension system is typically an attachment for agricultural equipment but it can be integral to the agricultural equipment.

The general operation of the device can be understood by explanation of the flotation and suspension system's use with a sweeper brush implement attached to nut harvesting machinery. The brush is used to sweep the crop on the ground to a desired location. The float assembly allows the brush to travel in a linear motion substantially perpendicular to the ground. This enhances the brush's sweeping performance by maintaining a consistent brush-to-ground contact patch as ground height varies. An additional benefit is a reduction in brush wear. The assembly also reduces the amount of force required for the brush to rise as it hits high spots or obstacles. In addition, the assembly allows the brush to freely travel downward in low spots. Two substantially parallel arms and a compression/tension component are used to suspend the brush.

Variations in ground height are transferred from the brush, through the connecting brackets and support arms to the force translation member, which allows the brush to be raised from or lowered to the ground. A compression component (a spring for example) at least partially suspends the weight of the brush and allows it to freely raise and lower as ground height varies.

The compression component could be a tension spring (capable of compression), compression spring, gas/hydraulic cylinder or any suitable compressive component. Sliding bearings on a linkage component can reduce friction as the brush floats upward or downward. The sliding bearings could be bearings, bushings, or low friction surface, such as, UHMW (ultra high molecular weight) polyethylene.

BRIEF DESCRIPTION OF DRAWINGS

The character of the invention, however, may be best understood by reference to embodiments of its structural form, as illustrated by the accompanying drawings, in which.

DETAILED DESCRIPTION OF THE PREFERRED EMBODIMENTS

Figure 1:
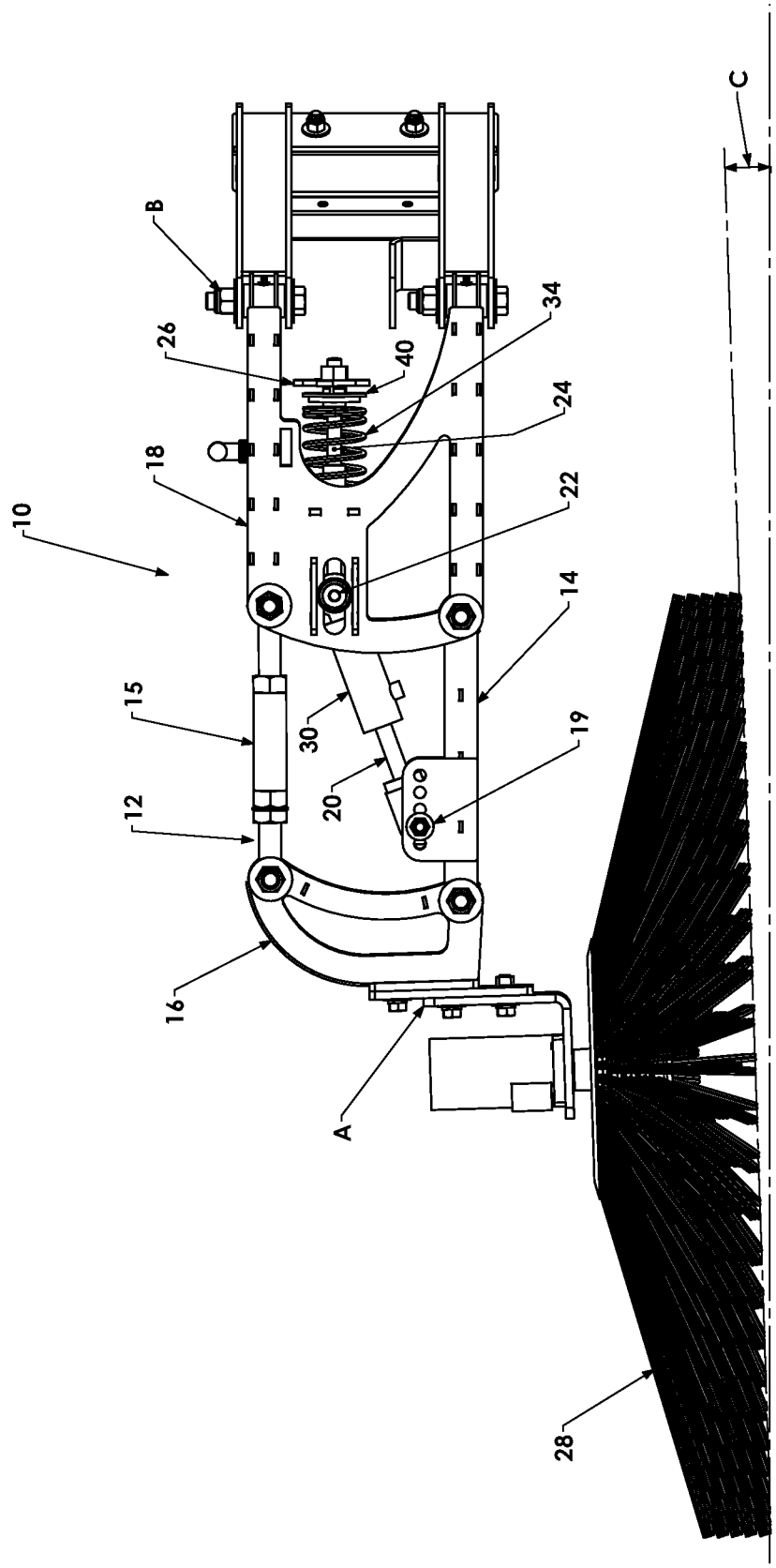
FIG. 1 is a side view of the implement flotation and suspension system with a rotary brush utilized as the implement.
Figure 2:
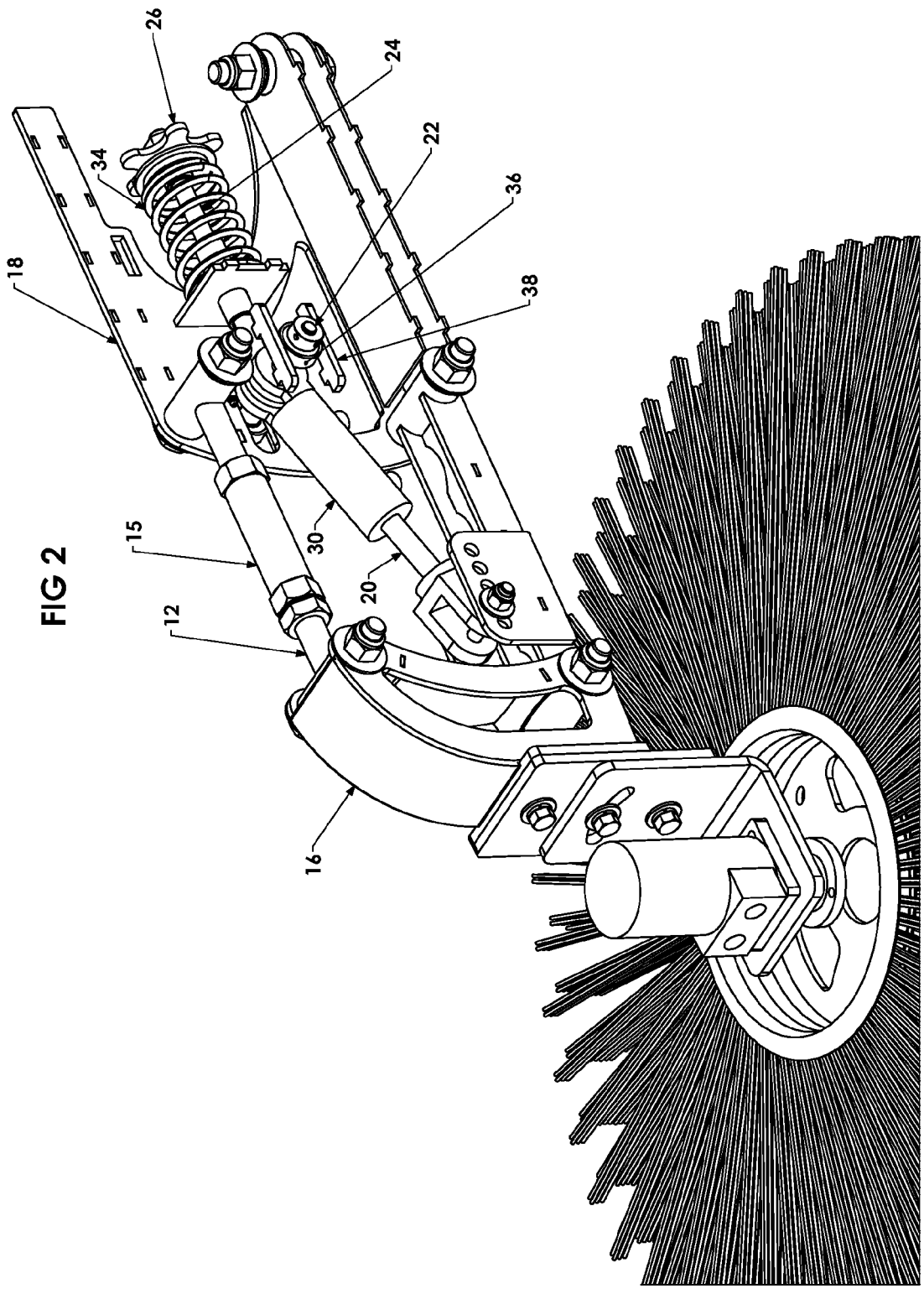
FIG. 2 is a perspective view of the system with the back bracket cutaway showing a spring component.

Referring to FIG. 1 and FIG. 2, which best show the general features of a preferred embodiment of the invention, the implement flotation and suspension system 10 is the assembly contained approximately between points A and B. The implement flotation and suspension system includes at least one upper support arm 12 and at least one lower support arm 14 substantially parallel to the upper support arm. The upper and lower support arms are pivotally attached to at least one front bracket 16 and at least one back bracket 18. Typically bracket assemblies are utilized.

A first adjustment mechanism 15 can be attached to the lower arm, upper arm, or any other applicable component of the implement flotation and suspension system. The first adjustment mechanism 15 could also be attached to the implement itself. The first adjustment mechanism (or position adjustment mechanism) allows the implement (brush) to be positioned to affect the angle C between the implement and the ground.

A force translation member 20 is connected to the upper or lower support arm. The force translation member shown in FIG. 1 is pivotally connected to the lower support arm at the front end and to a slide mechanism 22 at the back end. The slide mechanism illustrated in FIG. 2 contains a bearing member 36 which travels along upper and lower slide rails 38. The slide mechanism is movable along a linear path and is connected at its back end to a shaft 24. The shaft is substantially parallel to the linear path of the slide mechanism and the shaft comprises a second adjustment mechanism 26 to adjust the linear position of the slide mechanism.

A compression component is attached to the force translation member 20 and, in some cases, to the shaft 24. Typical compression components include, but are not limited to, a fluid-filled cylinder 30 or spring 34 or any combination of suitable compression devices.

Figure 3:
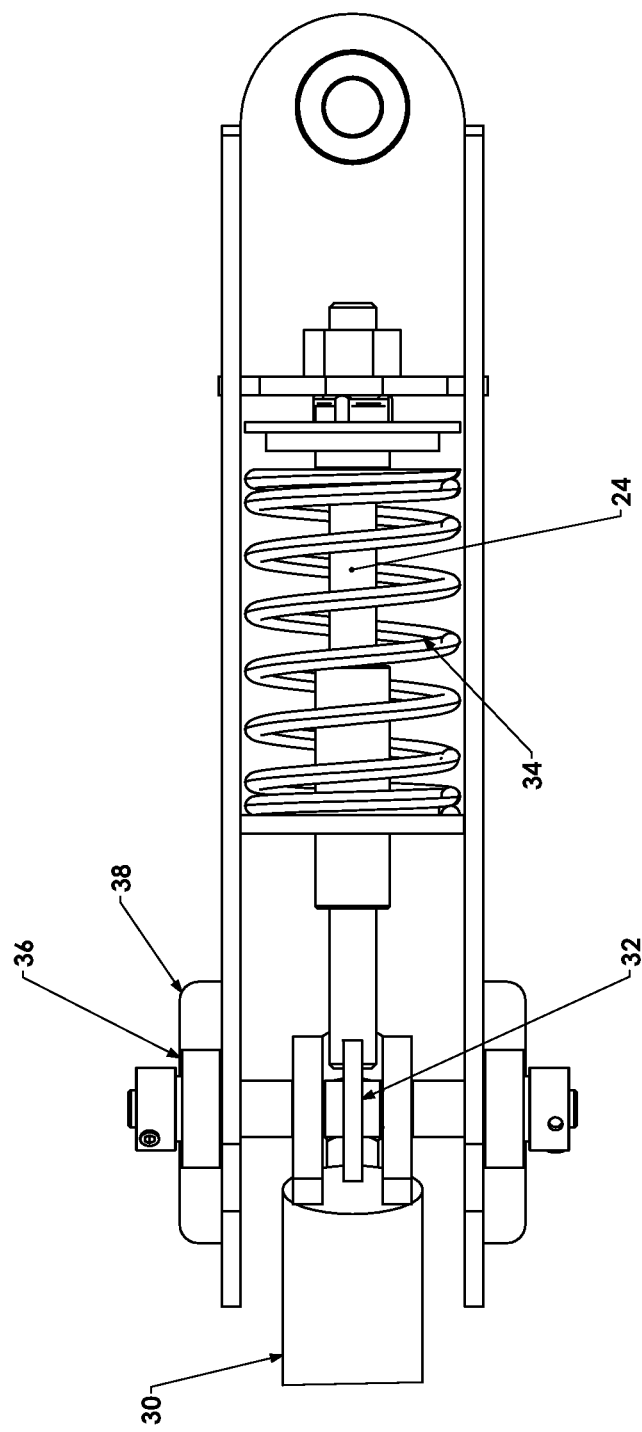
FIG. 3 is a top view of the slide mechanism connected to the rear shaft.

FIG. 3 shows a partial cutaway, top view of the connection between the force translation member 20 and the slide mechanism 22, and between the slide mechanism and the shaft 24. The force translation member 20 and shaft 24 can be connected to the slide mechanism through an eyelet or bushing 32. The bearing 36 is positioned at approximately the midpoint of the slide rails 38 in FIG. 3. The adjustment mechanism 26 can be used to vary the position of the bearing 36 with respect to the rails 38.

Figure 4:
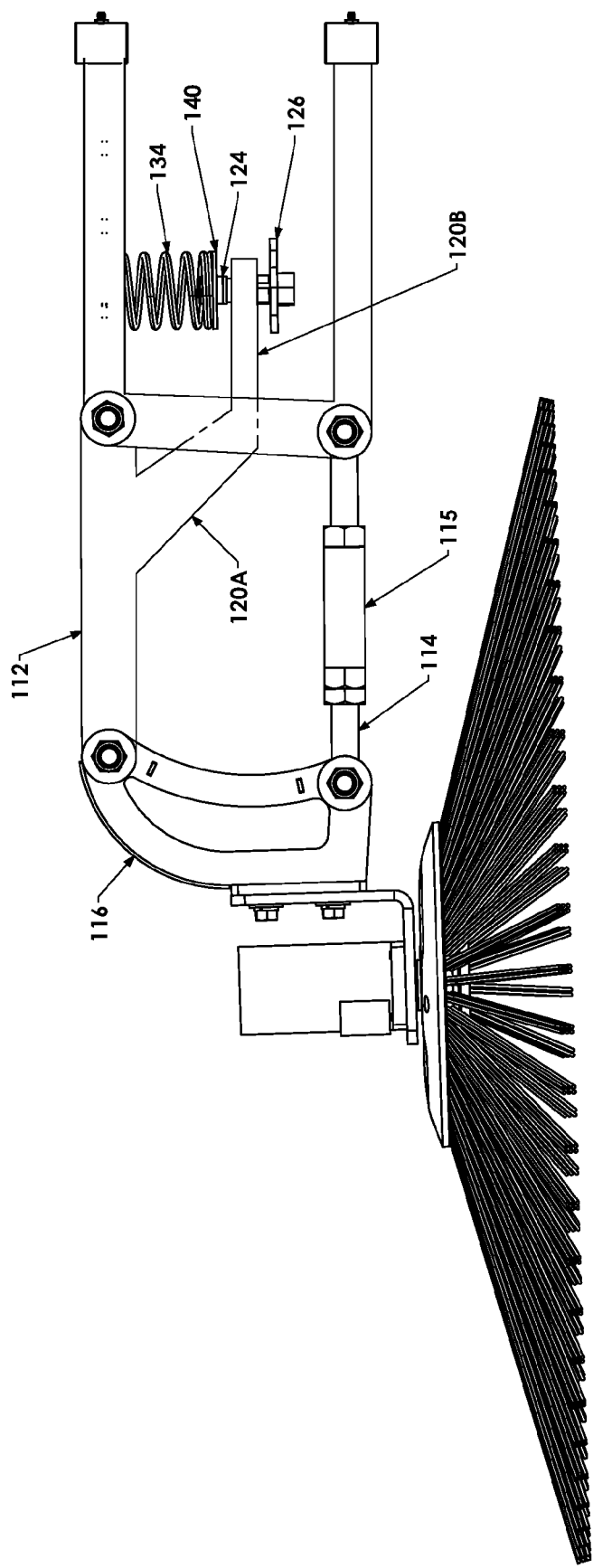
FIG. 4 is a side view of an alternative embodiment of the implement flotation and suspension system.

FIG. 4 shows a side view of an alternative embodiment of the implement flotation and suspension system utilized in conjunction with a rotary brush. In this embodiment, the force translation member has a first section 120A and a second section 120B with the second section approximately parallel to the upper 112 and lower 114 arms. The second section of the force translation member is connected to a shaft which contains a compression or tension component, e.g. a spring. The shaft can also contain a second adjustment mechanism 126 to adjust the height of the implement and the force that the implement exerts on the ground.

Figure 5:
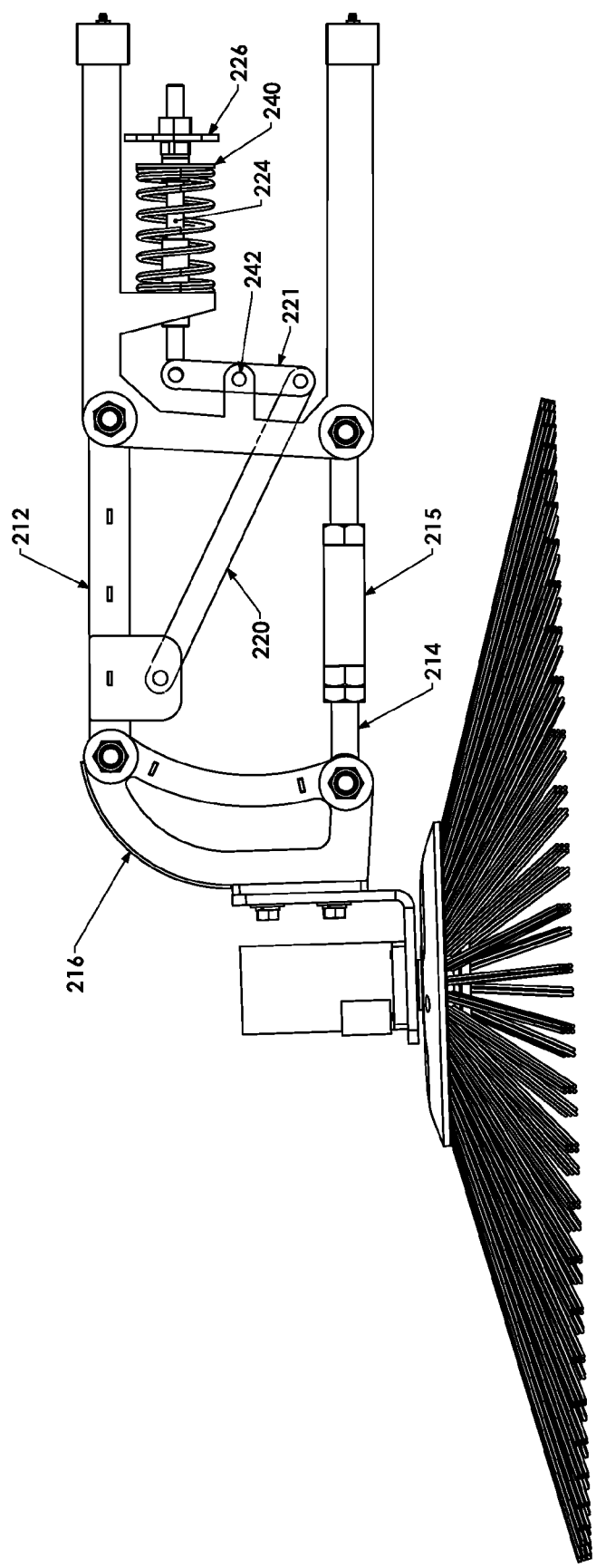
FIG. 5 is a side view of another alternative embodiment of the implement flotation and suspension system.

FIG. 5 shows a side view of another alternative embodiment of the implement flotation and suspension system utilized in conjunction with a rotary brush. In this embodiment, the force translation member is a two part member with the first part 220 pivotally connected to the second part 221 that is connected to a shaft. The shaft is approximately parallel to the upper 212 and lower 214 support arms.

Figure 7:
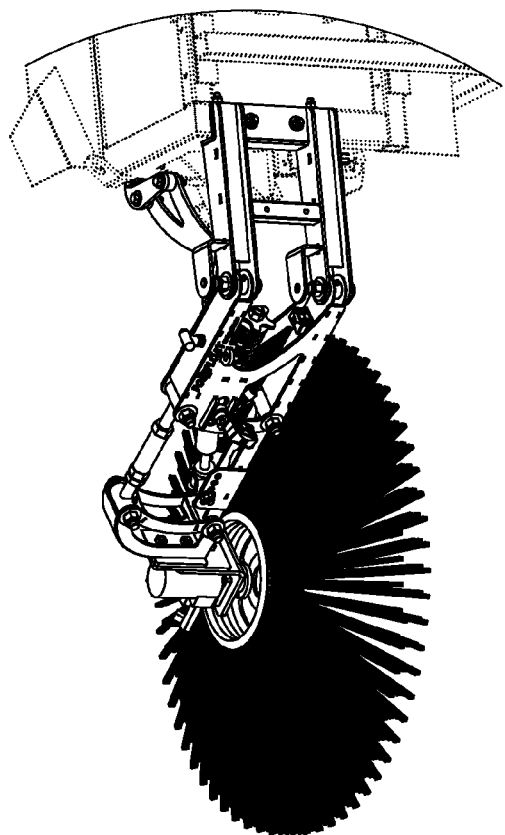
FIG. 7 is a perspective view of the implement flotation and suspension system utilized with a rotary brush.
Figure 6:
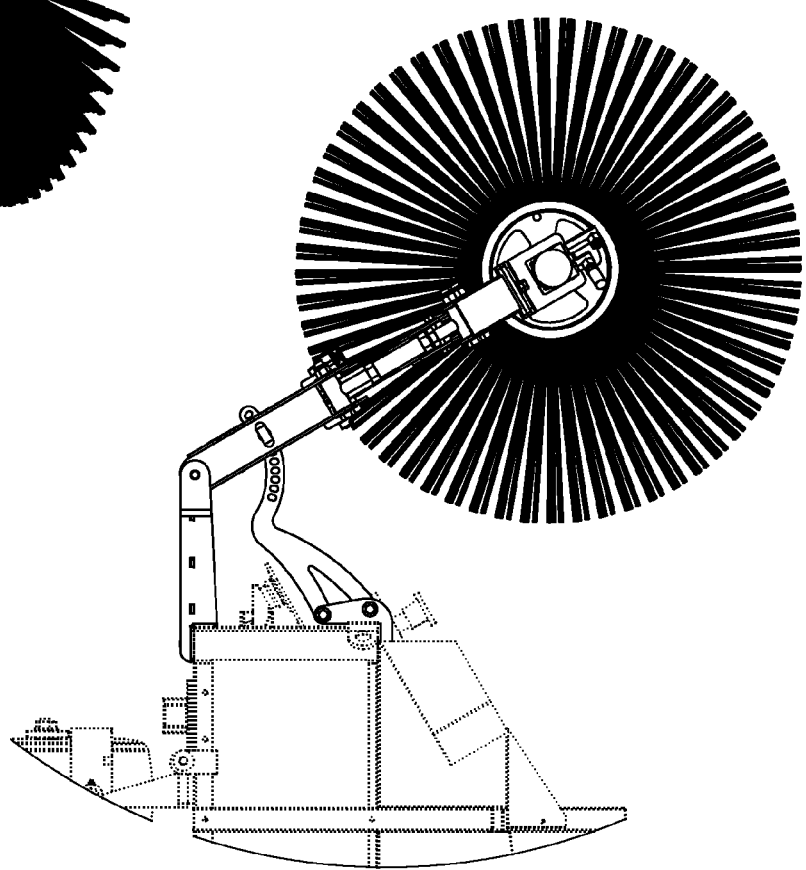
FIG. 6 is a top view of the implement flotation and suspension system utilized with a rotary brush.

FIG. 6 is a top view of the implement flotation and suspension system utilized with a rotary brush. FIG. 7 is a perspective view of the implement flotation and suspension system utilized with a rotary brush.

Figure 8:
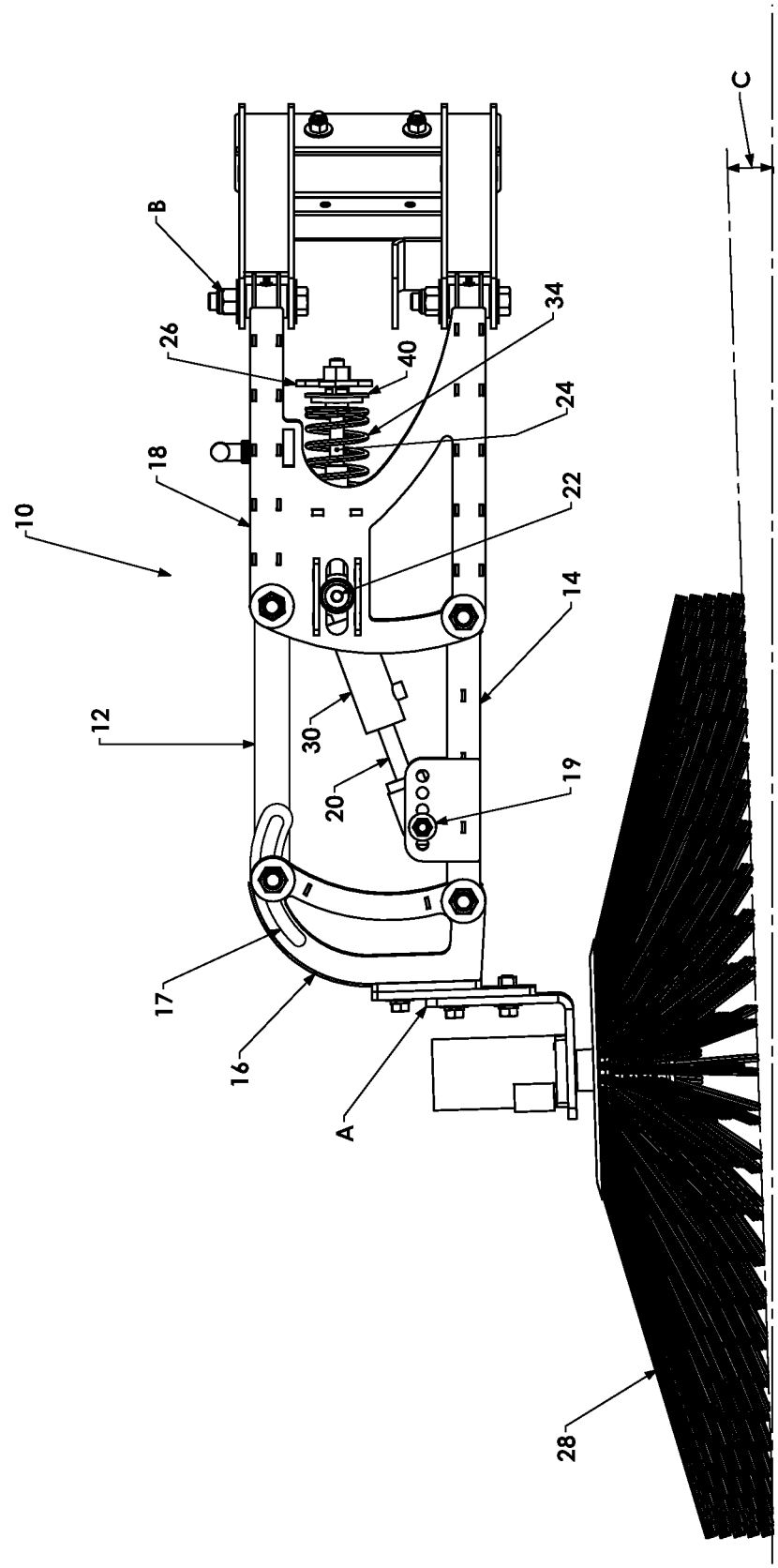
FIG. 8 is a side view of another embodiment of the implement flotation and suspension system with a rotary brush utilized as the implement.

FIG. 8 shows an alternative embodiment of the implement flotation and suspension system. In this embodiment, the upper and lower support arms can be nonadjustable and a position adjustment mechanism 17 is incorporated into the front bracket 16. The position adjustment mechanism 17 allows the implement (brush) to be adjusted to affect the angle C between the implement and the ground.

The function of the implement flotation and suspension system can be understood by analysis of the initial setup of the assembly attached to or integrated with agricultural equipment. When the system is attached to an implement on one end and a harvester or sweeper (for example) on the other end, the assembly system and implement can be suspended above the ground surface just before use.

Initially the angle between the bottom of the implement and the ground (see angle C in FIG. 1) can be set by utilizing the first adjustment mechanism 15. The first adjustment mechanism 15 is shown on the upper support arm 12 in FIG. 1.

At this step, the weight of the implement and the majority of the assembly will compress the spring (when a spring is utilized). The second adjustment mechanism (or tension adjustment mechanism) slightly adjusts the height of the implement with respect to the ground while approximately maintaining the initial angle between the bottom of the implement and the ground (angle C in FIG. 1 for example). When the implement is put in contact with the ground for initial setup or calibration, the spring decompresses in relation to the spring strength. The amount of force exerted on the ground by the implement (brush) can be adjusted by use of the second adjustment mechanism 26 which adjusts the length of shaft 24. Shaft 24 has a threaded portion (not shown) that communicates with the second adjustment mechanism 26.

As the implement connected to the suspension system (the brush as shown in FIGS. 1 and 2 for example) passes over an undulation (bump or small hill) in the ground surface, the force exerted on the implement by the ground will increase. This increase in ground force will thus lessen the tension on the force translation member and decompress the spring causing the front of the assembly and the implement to rise proportionally.

As the implement passes over a depression in the ground (cavity, hole, trench, etc.), the force exerted on the implement by the ground will decrease. The decrease in force by the ground surface, and the weight of the implement will cause the spring to be compressed thereby lowering the implement.

CONCLUSIONS, OTHER EMBODIMENTS, AND SCOPE OF INVENTION

First adjustment mechanism 15 is shown in FIG. 1 on the upper arm 12. The first adjustment mechanism (or position adjustment mechanism) is utilized to set the angle between the bottom of the implement and the ground (see angle C in FIG. 1). The first adjustment mechanism can be on the upper arm, lower arm or attached to the one of the brackets. Although the implement flotation and suspension system generally is within the boundaries of points A and B shown in FIG. 1, it is within the scope of the present invention to have the position adjustment mechanism attached to the implement and/or any other practical system component. Therefore the components of embodiments of the present invention are not constrained between the reference points A and B in FIG. 1.

Two additional embodiments of the implement flotation and suspension system are shown in FIGS. 4 and 5. The embodiment shown in FIG. 4 includes a similar first adjustment mechanism 115 on the lower arm (shown) or upper arm. The force translation member 120 is comprised of two non-parallel sections, a first section 120A and a second section 120B. The second section is substantially parallel to the upper 112 and the lower 114 arm.

The second adjustment mechanism 126 slightly adjusts the height of the implement with respect to the ground while approximately maintaining the initial angle between the bottom of the implement and the ground. When the implement is put in contact with the ground for initial setup or calibration, the spring decompresses in relation to the spring strength. The amount of force exerted on the ground by the implement (brush) can be adjusted by use of the second adjustment mechanism 126 which adjusts the length of shaft 124. Shaft 124 has a threaded portion (not shown) that communicates with the second adjustment mechanism 126. The embodiment shown in FIG. 4 includes a fixed support plate 140 for the spring.

The embodiment shown in FIG. 5 includes a similar first adjustment mechanism 215 on the lower arm (shown) or upper arm. The force translation member in this embodiment is a two part member with the rocker arm 221, the second part, pivotally connected to the first part 220. The rocker arm portion is pivotally connected at its other end to a shaft 224 and at its midpoint 242 to the second bracket. The shaft 224 is substantially parallel to the upper 212 and the lower 214 arm. The implement (brush) will be lowered when the rocker arm 221 rotates in a counterclockwise direction. The implement will be raised when the rocker arm rotates in a clockwise direction.

The second adjustment mechanism 226 slightly adjusts the height of the implement with respect to the ground while approximately maintaining the initial angle between the bottom of the implement and the ground. When the implement is put in contact with the ground for initial setup or calibration, the spring decompresses in relation to the spring strength. The amount of force exerted on the ground by the implement (brush) can be adjusted by use of the second adjustment mechanism 226 which adjusts the length of shaft 224. Shaft 224 has a threaded portion (not shown) that communicates with the second adjustment mechanism 226. The embodiment shown in FIG. 5 includes a fixed support plate 240 for the spring.

An embodiment shown in FIG. 8 discloses an implement flotation and suspension system with the first adjustment mechanism 17 incorporated into the front bracket assembly. In such embodiments, the adjustability of one or more of the support arms is optional.

Embodiments shown in FIG. 1 and FIG. 8 have adjustment positions 19 to vary the position of the translation member 20. This allows positioning of the implement with respect to the ground thus affecting the force that the implement exerts on the ground.

It will be obvious to those skilled in the art that modifications may be made to the embodiments described herein without departing from the scope of the present invention. Although the implement flotation and suspension system has been described in conjunction with agricultural equipment, its use is not constrained to the agricultural field. Thus the scope of the invention should be determined by the appended claims in the formal application and their legal equivalents, rather than by the examples given.

What is claimed is:

1. A suspension system comprising:
    a length-adjustable support arm and a rigid support arm, the support arms pivotally connected to a front bracket housing and to a rear bracket housing, the support arms held substantially parallel one above the other by the bracket housings;
    a force translation member connected at one end to the rigid support arm and at the opposite end to a compression assembly;
    wherein the suspension system supports the weight of an attached ground-working implement in a state of suspension over the ground, the implement in communication with the ground surface such that deviations in ground level change the level of force translated through the implement and force translation member to the compression assembly thereby increasing or decreasing compression rate of the assembly accordingly resulting in a respective raising or lowering of the ground-working implement; and
    wherein the force translation member is linearly adjustable relative a mounting bracket on the rigid support arm, the force translation member pivotally connected to the support arm via the bracket.

2. The suspension system of claim 1 wherein the force translation member is connected to a compression cylinder filled with fluid.

3. The suspension system of claim 1 wherein the compression assembly includes a spring stationed about a shaft, the shaft in communication with a tension adjustment mechanism for adjusting the amount of spring tension.

4. The suspension system of claim 3 wherein the compression assembly includes a rocker arm pivotally connected at one end to the force translation member and at the opposite end to the shaft of the compression assembly, the rocker arm pivotally connected at a midpoint to a protruding arm on the rear bracket housing.

5. The suspension system of claim 2 further including a slidable component connected to the compression cylinder.

6. The suspension system of claim 5 wherein the slidable component comprises an axle horizontally disposed through opposing elongate openings provided through opposing walls of the rear bracket housing, a pair of bearings or bushings mounted on the axle outside the opposing bracket housing walls the bearings or bushings each tracked between upper and lower slide rails oriented above and below each elongate opening.

7. The suspension system of claim 5 wherein the slidable component comprises a rod horizontally disposed through opposing elongate openings provided through opposing walls of the rear bracket housing, the openings presenting a low friction surface for the rod.

8. The suspension system of claim 3 wherein the compression assembly is disposed vertically.

9. The suspension system of claim 8 wherein the force translation member is welded to or contiguously formed with the rigid support arm at one end and mounted at the opposite end over the compression assembly shaft between the spring and the tension adjustment mechanism.

10. The suspension system of claim 1 wherein the compression assembly includes one of or a combination of a spring and a fluid-filled cylinder.

11. A method for mitigating an upward force activated against a ground-working implement mounted to a suspension system, the suspension system including a length-adjustable support arm and a rigid support arm, the support arms pivotally connected to a front bracket housing and to a rear bracket housing, and a force translation member connected at one end to the rigid support arm and at the opposite end to a compression assembly, the force translation member being linearly adjustable relative a mounting bracket on the rigid support arm to which the force translation member is pivotally connected, comprising the steps:
    (a) translating the force through the implement and the force translation member to the compression assembly;
    (b) reducing tension in the compression assembly as a result of the force translated at step (a); and
    (c) urging the force translation member forward against the rigid support arm causing an upward torque on the front bracket housing as a result of the reduction in tension at step (b).

12. The method of claim 11 wherein in step (a) the compression assembly includes a spring stationed about a shaft, the shaft in communication with a tension adjustment mechanism for adjusting the amount of spring tension.

13. The method of claim 11 wherein in step (a) the force translation member is connected to a compression cylinder filled with fluid.

14. The method of claim 12 wherein in step (a) the compression assembly is disposed vertically.

15. The method of claim 14 wherein in step (a) the force translation member is welded to or contiguously formed with the rigid support arm at one end and mounted at the other end over the compression assembly shaft between the spring and the tension adjustment mechanism.

16. The method of claim 11 wherein in step (b) the compression assembly includes one of or a combination of a spring and a fluid-filled cylinder.

17. The method of claim 11 wherein in step (b) the reduction in tension in the compression assembly occurs immediately upon translation of the upward force exerted on the ground-working implement.

18. The method of claim 11 wherein the ground-working implement is a circular brush powered to rotate for sweeping nuts toward a designated area.

* * * * *